Patented Mar. 28, 1950

2,501,665

UNITED STATES PATENT OFFICE 2,501,665

LIGNIN RESINS AND PROCESS OF MAKING SAME

Raymond Norris Evans and Angelo Paul Ingrassia, Laurel, Miss., assignors to Masonite Corporation, Laurel, Miss., a corporation of Delaware No Drawing. Application May 24, 1946,
Serial No. 672,156

6 Claims. (Cl. 260—17.3)

This invention relates to resins having high resistance to alkali and water and made from components comprising lignin in substantial proportions, and the methods of making and using such resins.

By the present invention, lignin, which is readily soluble in alkali, forming dark-colored solutions, is reacted with an aminotriazine and an aldehyde, whereby resin is obtained which is resistant to alkali, resistant to absorption of water, and has thermo-setting characteristics. In order to secure intimate admixture of the reactive components and so facilitate their reaction, they may be intimately mixed in the dry state in a conventional mixing apparatus, or they may be put into solution in organic solvents adapted to dissolve the reactive components.

The reaction between lignin, an aminotriazine and an aldehyde can be carried out with use of an alkali soluble lignin which has been isolated, or it can be carried out with such lignin insitu in acid-hydrolyzed ligno-cellulose fiber, or both. In carrying on the reaction with lignin in acid-hydrolyzed ligno-cellulose fiber, hardboards, molded products and the like, containing such fiber as well as the resinous products of the reaction can be produced which are resistant to alkali and water.

The main objects of the invention are the provision of resins made from lignin, an aminotriazine and an aldehyde, and of products containing such resins and acid-hydrolyzed ligno-cellulose fiber, which resins and products are of high alkali resistance, and are resistant to absorption of water, and the provision of methods for the production of such resins and resin containing products.

In carrying out the present invention, lignin is caused to react with an aminotriazine, preferably melamine, and an aldehyde, preferably formaldehyde or paraformaldehyde, at an elevated temperature. If desired, the melamine and formaldehyde may be reacted to form a condensation product (one of such condensation products is sold under the trade-name "Melmac" 402) before addition to and reaction with the lignin to form the novel lignin resins.

The relative proportions of the reactants may vary within fairly wide limits. Excellent results have been obtained with proportions ranging from 1 up to about 6 moles of formaldehyde, preferably about 3 moles formaldehyde, to 1 mole of melamine. The proportion of lignin may be from about 10% up to about 80%, preferably about 30% to 40%, based upon the weight of the melamine.

The soluble lignin used in the reaction is preferably provided by subjecting wood or other ligno-cellulose material to hydrolysis in the presence of mild acids. The acid-hydrolyzed ligno-cellulose material is preferably prepared by subjecting wood chips to the action of high-pressure steam in a closed chamber, as for example a gun, as described in U. S. patent to Mason No. 1,824,221. In such treatment, organic acids such as acetic and formic acids are formed, and acid hydrolysis of the ligno-cellulose material is effected, with lignin being set free. After treatment with steam, the contents of the gun are disintegrated, preferably by being explosively discharged from the region of high steam pressure to a region of substantially atmospheric pressure. Material so produced has a pH of about 3 to 4.

The time required for the steam treatment decreases rapidly with increase of the steam pressure used. For example, 25 minutes treatment with steam at 275 p. s. i. (temperature of 212° C.) has approximately the same effect as treatment for 5 seconds with steam at 1000 p. s. i. (temperature of 285° C.). Such treatment is well adapted for production of fiber for making hardboards and like products.

In general, the longer the steam treatment is continued at a given temperature, the higher is the proportion of the freed soluble lignin, and such longer steam treatment is preferable in case the lignin is to be extracted. For example, fiber obtained from wood chips subjected to steam raised to 600 p. s. i. in 30 seconds, then raised to 1000 p. s. i. and held for 5 seconds, followed by preferably explosive disintegration, contains a good proportion of extractible lignin, as for example 10 to 12% or dry weight of chips. Higher yields of such lignin can be extracted from ligno-cellulose material given a steam treatment of 15 or more seconds with steam at 1000 p. s. i., for example. For illustration, a typical figure for yield of soluble lignin from wood chips treated with steam at 1000 p. s. i. for 15 seconds and reduced to fiber is about 17–18% based on dry weight of chips. The steam-treated and disintegrated material is preferably washed with water to largely remove the water-soluble organic acids, such as formic and acetic, and water-soluble derivatives of hemi-cellulosic material.

For extraction of the lignin from acid-hydrolyzed ligno-cellulose, dilute alkali solution, such as 1–3% sodium hydroxide solution for example, is preferably used, and the lignin precipitated by acidification of the solution, as for example by addition of hydrochloric acid, and then separated from the liquid by filtration. The separated lignin is preferably treated with dilute hydrochloric acid to set free any cations picked up in the process, filtered and washed with distilled water. Instead of treating with dilute alkali, organic solvents, such as methyl "Cellosolve" for example, can be used to dissolve the lignin, and the lignin recovered by precipitating in water or by evaporating the solvent or in other ways. Treating the entire mass of hydrolyzed ligno-cellulose with such organic solvents is expensive and it is preferred to extract the lignin therefrom with dilute alkali solution and precipitate it and then confine the treatment with the organic solvents to the lignin material so obtained. The lignin used for resin making in examples below was prepared by treatment of acid-hydrolyzed exploded wood fiber with 3% sodium hydroxide solution at a temperature of 50° C., and treated with dilute hydrochloric acid and washed as above described. Such lignin when precipitated and dried is light and fluffy.

Acid-hydrolyzed ligno-cellulose fiber for making sheet or like products is prepared, for example, by subjecting wood or other ligno-cellulose material to the action of high pressure steam, as described above. The hydrolysis treatment of the ligno-cellulose material is, however, generally carried out at a less degree of severity as compared with the degree of hydrolysis applied to ligno-cellulose material which is hydrolyzed for the purpose of extracting lignin therefrom. The less severe hydrolysis is applied in preparation of the fiber stock in order to retain a better degree of fiber structure. The acid-hydrolyzed ligno-cellulose fiber thus prepared contains about 5 to 12% lignin (based on the weight of the ligno-cellulose material) freed as a result of the hydrolysis. This lignin contained in the ligno-cellulose material will readily react with the melamine and formaldehyde components. If desired, additional lignin may be added with the melamine and formaldehyde components, to increase the amount of lignin resin in the final reaction product, and such additional lignin may or may not have been previously reacted with the melamine and the formaldehyde.

Since the reaction is preferably carried out in the presence of acid-hydrolyzed ligno-cellulose fiber, no catalyst need ordinarily be added because of the acidic nature of the ligno-cellulose fiber. If catalysts are added they should preferably be acid catalysts, such as for example, phthalic acid, maleic acid, or the like. Ordinarily no added catalysts are necessary, but they may be used if desired to carry out the reaction at specially low temperatures.

The reaction between lignin, melamine and formaldehyde is conveniently carried out in the presence of oxygenated organic compounds in which the melamine with the formaldehyde and the lignin are soluble. Suitable organic compounds for this purpose are mono alkyl ethers of ethylene glycol, such as methyl "Cellosolve" and ethyl "Cellosolve," dioxane, tetrahydrofurfuryl alcohol and the like, or mixture thereof. Such organic compounds may or may not enter into the reaction.

The melamine, formaldehyde and lignin may also be reacted without adding a solvent, as for example, with the use of paraformaldehyde. In such cases the lignin, melamine and paraformaldehyde are thoroughly dry mixed followed by the application of heat and pressure to the mixed components.

Although melamine and formaldehyde are the preferred components for reaction with lignin, other triazines and aldehydes may be used to form lignin-resin products. Other triazine compounds which may be used include melamine derivatives such as 2,4,6 triethyltriamino-1,3,5 triazine, 2,4,6 triphenyltriamino-1,3,5 triazine and the like, ammeline, ammelide, formoguanamine and the like. Other aldehydes which may be used are, for example, acetaldehyde, furfural, benzaldehyde, and the like or mixtures thereof.

Parts in the examples which follow are parts by weight.

Example 1.—180 parts of melamine, 375 parts of 37% formaldehyde solution, 54 parts of lignin and 106 parts of methyl "Cellosolve" (monomethyl ether of ethylene glycol) were placed in a flask, and the mixture heated and stirred 15 hours at a temperature of 45° C. The resin produced was a black thick liquid resin which became viscous on standing for 48 hours at room temperature.

Acid-hydrolyzed ligno-cellulose fiber material was prepared by subjecting hardwood chips to the action of steam in a closed chamber at a pressure raised to 600 p. s. i. and corresponding temperature in about 30 seconds, and then raised to 1000 p. s. i. with corresponding temperature. The last named pressure was held for about 4 seconds and the treatment with steam was followed by disruptively discharging the chamber contents to substantially atmospheric pressure. The fiber contained about 12% of free lignin, which was freed as a result of the hydrolysis treatment of the ligno-cellulose material. The fiber was ground and passed through a 40-mesh screen.

100 parts of the above prepared resin were mixed with 265 parts methyl "Cellosolve" together with 100 parts of the above prepared acid-hydrolyzed ligno-cellulose fiber. After thorough mixing of the components in a mechanical mixer, the resin fiber mixture was placed in a wire basket and air-dried at 50° C. until the volatile content was reduced to about 15%. The material was ground and passed through a 40-mesh screen. The volatile contents were further reduced to about 5% by heating in an oven.

A molded specimen of the ground material was prepared by pressing the material for a period of 5 minutes in a heated press at a pressure of 1750 p. s. i. and temperature of 165° C., and chilling while under pressure. The molded specimen had the following properties:

1. Specific gravity _____ 1.33
2. Modulus of rupture p. s. i. _____ 9,150
3. Hardness Rockwell M Scale (room temp.) _____ 106
4. Hardness Rockwell M Scale (105° C.) __ 89
5. Water immersion 24 hours, percent uptake _____ 1.6
6. 1% alkali immersion 24 hours, percent uptake _____ 1.6
7. Color of alkali solution_____ Clear Example 2.—180 parts of melamine and 375 parts of 37% formaldehyde solution were stirred at 65° C. for 3 hours. To 130 parts of the thus formed melamine and formaldehyde reaction product was added 12 parts of lignin and the reaction continued with stirring to produce a resin.

To 100 parts of acid-hydrolyzed ligno-cellulose fiber, prepared as described in Example 1, were added 126 parts of the above resin and 265 parts methyl "Cellosolve" and these materials thoroughly mixed in a mechanical mixer. This resin-fiber material was placed in a wire basket and held at a temperature of 70° C. in a vacuum oven for 5 hours, and then dried at 50° C. for 15 hours until the volatile contents were reduced to about 10%.

A molded specimen of the ground material was prepared by pressing the material for a period of 5 minutes in a heated press at a pressure of 1750 p. s. i. and temperature of 165° C. and chilling while under pressure. The molded specimen had the following properties:

1. Specific gravity _____ 1.35
2. Modulus of rupture (p. s. i.) _____ 8,850
3. Hardness Rockwell M (room temp.) ____ 102
4. Hardness Rockwell M 105° C _____ 70
5. Water immersion 24 hours, per cent uptake _____ 2.3
6. 1% alkali immersion 24 hours, per cent uptake _____ 2.4
7. Color of alkali solution _____ Clear

*Example 3.*—A resin solution was made by adding 212 parts of methyl "Cellosolve" to 150 parts of a condensation product of melamine and formaldehyde (sold in commerce as "Melmac" No. 402). To this solution .3 part of diammonium hydrogen phosphate catalyst was added.

Substantially bone-dry acid-hydrolyzed lignocellulose fiber, prepared as described in Example 1, was formed into a mat. The mat, 63 parts by weight, was impregnated with 113 parts of the above prepared resin solution. The resin-fiber combination was heated for 4½ hours in a vacuum oven at 60° C. After removal from the oven, the impregnated mat of fiber was ground in a Wiley mill to a fineness which would pass through a 40-mesh screen. The volatile contents were about 8.4%.

A molded specimen was prepared by pressing the material in a heated press at a pressure of 1750 p. s. i. at a temperature of 165° C. for a period of 5 minutes and chilled while under pressure. The molded specimen had the following properties:

1. Specific gravity _____ 1.40
2. Modulus of rupture (p. s. i.) _____ 13,040
3. Hardness Rockwell M (room temp.) ____ 104
4. Hardness Rockwell M 105° C _____ 75
5. Water immersion 24 hours, per cent uptake _____ 1.4
6. 1% alkali immersion 24 hours, per cent uptake _____ 1.3
7. Color of alkali solution _____ Clear

*Example 4.*—The following ingredients were weighed out and thoroughly mixed in a tubular mill for 3 hours:

15 parts of melamine
4.5 parts lignin
10.7 parts paraformaldehyde
1.5 parts finely-divided alpha cellulose A portion of the resulting mixture was pressed for 5 minutes in a mold at a pressure of 1750 p. s. i. and temperature of 130° C., and then chilled under pressure. The molded specimen had the following characteristics:

1. Specific gravity _____ 1.44
2. Hardness Rockwell M (room temp.) ____ 99
3. Hardness Rockwell M 105° C _____ 43
4. 1% alkali immersion 24 hours, per cent uptake _____ 1.4
5. Color of alkali solution __ Very slightly discolored

*Example 5.*—216 parts of a condensation product of melamine and formaldehyde (sold in commerce as "Melmac" No. 402), and 31.5 parts lignin were added to 233 parts methyl "Cellosolve" to form a resin solution. The solution was stirred for 1 hour at about 55° C. The yield was about 467 parts resin solution.

90 parts of the above formed resin solution was mixed with 100 parts by weight of substantially bone-dry acid-hydrolyzed fiber obtained as described in Example 1. The resin-fiber combination was heated for about 35 minutes in an oven at 100° C. The volatile contents were about 5%.

A molded specimen was prepared by pressing the material for a period of 5 minutes in a heated press at a pressure of 1750 p. s. i. at a temperature of 165° C. and then chilling while under pressure. The molded specimen had the following properties:

1. Specific gravity _____ 1.40
2. Modulus of rupture (p. s. i.) _____ 13,050
3. Hardness Rockwell M (room temp.) ____ 106
4. Hardness Rockwell M 105° C _____ 76
5. Water immersion 24 hours, per cent uptake _____ 1.3
6. 1% alkali immersion 24 hours, per cent uptake _____ 1.8
7. Color of solution _____ Clear

*Example 6.*—126 parts melamine, 288 parts furfural, 240 parts of 37% neutralized formaldehyde, and 90 parts lignin were thoroughly mixed and heated for about 90 minutes at a temperature of 60° C. to form a viscous resin solution.

125 parts of the formed resin solution, 100 parts acid-hydrolyzed ligno-cellulose fiber and 200 parts methyl "Cellosolve" were placed in a Baker Perkins mixer and thoroughly mixed. The mixed fibrous mass was heated for about 20 minutes at 130° C. to substantially reduce the volatile content. The volatile content after such heating was about 10%.

After grinding the fibrous mass and passing it through a 40-mesh screen, a molded specimen of the ground material was prepared by pressing the material for a period of 5 minutes in a heated press at a pressure of 1750 p. s. i. and at a temperature of 165° C. and chilling while under pressure. The molded specimen had the following properties:

1. Specific gravity _____ 1.39
2. Modulus of rupture (p. s. i.) _____ 8,500
3. Hardness Rockwell M (room temp.) ____ 90
4. Hardness Rockwell M 105° C _____ 50
5. Water immersion 24 hours, per cent uptake _____ 2
6. 1% alkali immersion 24 hours, per cent uptake _____ 2.9
7. Color of solution _____ Slightly discolored The resins of the present invention can be put to many uses in addition to those mentioned above. The resins per se, when dissolved in suitable carriers, may be sprayed or brushed on surfaces to form good coating materials. The cured resins are effective as laminating absorptives in lamination of paper, hardboard, and plywood, in bonding laminates and wood veneer to plastics, metals, wood, fibrous boards, and the like. Their properties of withstanding the action of alkali solutions, low water uptake and high hardness also adapt them for use in making hardboard products. Also, their property of withstanding relatively high temperatures during the pressing operations specially adapts them for use as molding powders with or without suitable fillers in making hot molded products. Such products, in addition to being good construction materials, are well adapted for form liners, drain boards, table tops and the like.

It is to be understood that the examples are for illustration only and not for limitation, and the breadth of the invention is as defined in the claims.

We claim:

1. Process of preparing a thermo-setting resin having water and alkali resistant properties which comprises dissolving alkali soluble lignin in an ether compound containing only C, H and O, adding an amino-triazine compound having at least one hydrogen attached to the non-ring amino nitrogen and formaldehyde to the lignin solution, and subjecting the solution to heat to obtain a reaction between the lignin, the amino-triazine compound and formaldehyde.

2. Process of preparing a water and alkali resistant fibrous product which comprises subjecting a solution of melamine, formaldehyde, alkali soluble lignin and an ether compound containing only C, H and O to heat to obtain a resinous reaction material, mixing the resinous reaction material with acid-hydrolyzed ligno-cellulose fiber material containing free lignin, and heating the components to react the resinous reaction material with the lignin of the fiber material.

3. Process of preparing a water and alkali resistant fibrous product which comprises subjecting a solution of melamine, formaldehyde, alkali soluble lignin and an ether compound containing only C, H and O to heat to obtain a resinous reaction material, mixing the resinous reaction material with acid-hydrolyzed ligno-cellulose fiber material containing free lignin, heating the mixture to remove a substantial proportion of volatile contents, and subjecting the mixture to heat and pressure to form a consolidated product.

4. Process of preparing a water and alkali resistant fibrous product, which comprises mixing alkali soluble lignin, melamine, paraformaldehyde and cellulosic fiber, and subjecting the mixture to heat and pressure to form a consolidated product.

5. Process of preparing a water and alkali resistant fibrous product, which comprises mixing acid-hydrolyzed ligno-cellulose fiber, melamine and paraformaldehyde, and subjecting the mixture to heat and pressure to form a consolidated product.

6. Process of preparing a water and alkali resistant product which comprises mixing a solution containing melamine and formaldehyde dissolved in an ether compound containing only C, H and O with hydrolyzed ligno-cellulose fiber, heating the mixture to substantially reduce the volatile content, and subjecting the mixture to heat and pressure to form a consolidated product.

RAYMOND NORRIS EVANS.
ANGELO PAUL INGRASSIA.

REFERENCES CITED

The following references are of record in the file of this patent:

UNITED STATES PATENTS

| Number | Name | Date |
|---|---|---|
| 1,922,690 | Lougovoy | Aug. 15, 1933 |
| 2,068,926 | Nevin | Jan. 26, 1937 |
| 2,156,160 | Olson | Apr. 25, 1939 |
| 2,197,357 | Widmer | Apr. 16, 1940 |
| 2,197,724 | Hovey | Apr. 16, 1940 |
| 2,320,817 | D'Alelio | June 1, 1943 |
| 2,368,451 | D'Alelio | Jan. 30, 1945 |

FOREIGN PATENTS

| Number | Country | Date |
|---|---|---|
| 282,635 | Great Britain | Dec. 6, 1928 |